US006639886B1

United States Patent
Cook et al.

(10) Patent No.: US 6,639,886 B1
(45) Date of Patent: Oct. 28, 2003

(54) THERMAL MANAGEMENT SYSTEM IN SINGLE OR MULTIPLAYER DISK SYSTEM

(75) Inventors: Robert D. Cook, Farmington, MI (US); George A. Garfinkel, Westland, MI (US); Lakhi N. Goenka, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 453 days.

(21) Appl. No.: 09/616,547

(22) Filed: Jul. 14, 2000

(51) Int. Cl.[7] .................. G11B 33/14; G06F 1/20; H05K 7/20
(52) U.S. Cl. ............... 369/75.1; 360/97.02; 361/687; 361/692
(58) Field of Search .................. 369/75.1, 75.2, 369/77.1, 77.2, 30.63, 31.01; 360/97.01, 97.02, 97.03, 97.04; 361/679, 684, 685, 687, 688, 689, 690, 691, 692, 693, 694

(56) References Cited

U.S. PATENT DOCUMENTS 4,587,645 A * 5/1986 Wong et al. ............... 369/75.1
5,237,560 A * 8/1993 Tani et al. .................. 369/291
5,335,217 A * 8/1994 Kaneda et al. ............. 369/77.2
5,418,775 A * 5/1995 Okatani .................... 369/275.5
5,532,996 A * 7/1996 Okabe et al. .............. 369/77.2
6,141,213 A * 10/2000 Antonuccio et al. ........ 361/687
6,246,654 B1 * 6/2001 Omori et al. .............. 369/75.2

FOREIGN PATENT DOCUMENTS

JP   6-20461   * 1/1994
JP   6-36547   * 2/1994

* cited by examiner

Primary Examiner—David L. Ometz
(74) Attorney, Agent, or Firm—John E. Kajander

(57) ABSTRACT

A apparatus and method for dissipating heat from the disk portion of a multimedia radio. The apparatus and method uses the Von Karman Viscous Pump Principle to strategically introduce holes in the housings and brackets of the multimedia radio to improve the air flow across at least one of the surfaces of an installed and operational disk. The amount, size, and configuration of these holes are a function of the type and size of disk used and the rotational speed of the disk in operation. This reduces the possibility of hot media and reduces the possibility of heat shutdown of disk components.

15 Claims, 3 Drawing Sheets

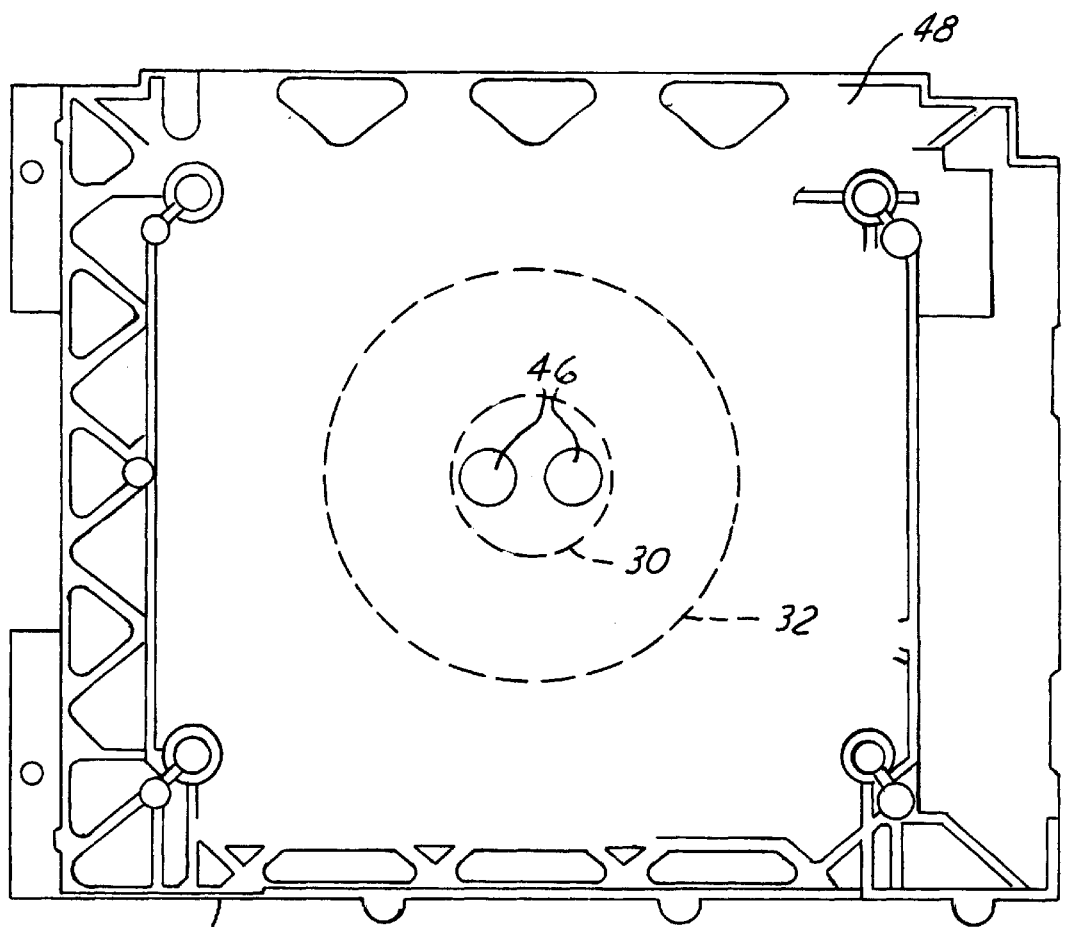
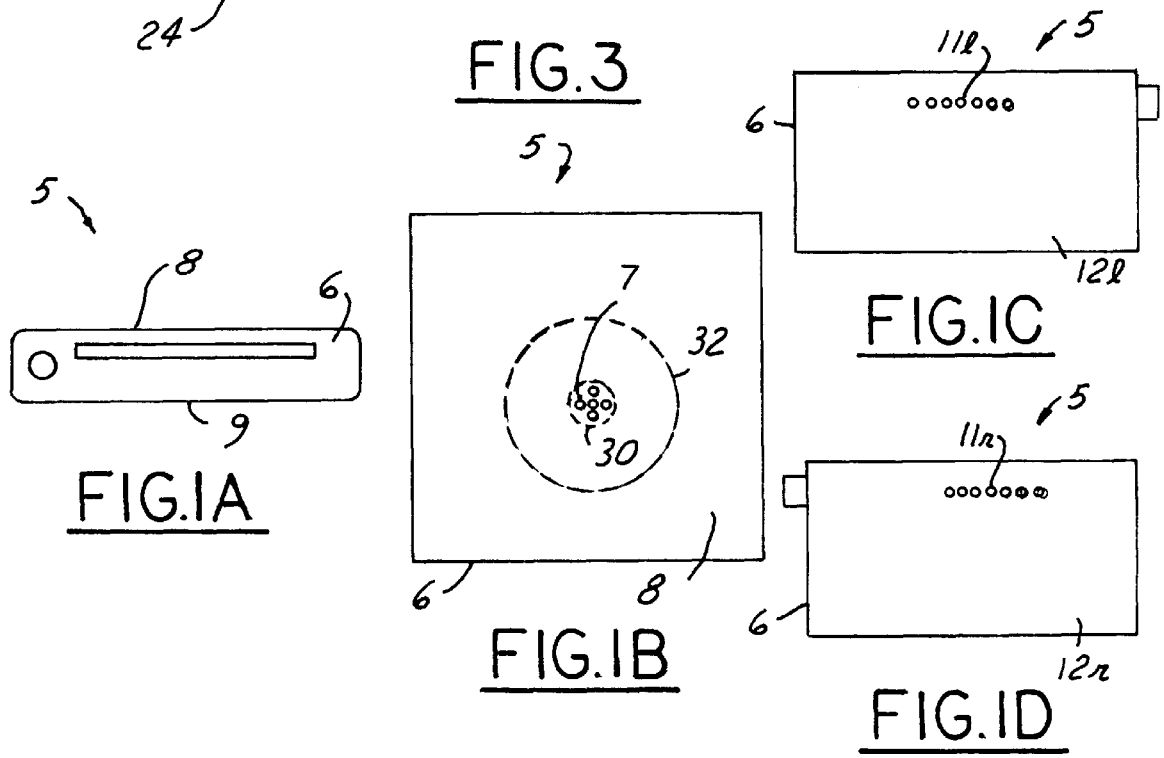

THERMAL MANAGEMENT SYSTEM IN SINGLE OR MULTIPLAYER DISK SYSTEM

TECHNICAL FIELD

The present invention relates generally to entertainment systems and more particularly to thermal management systems for single or multiplayer disk systems used as stand-alone units or in multimedia systems.

BACKGROUND

Radios have long been used to provide entertainment and information for the listener. More recently, other types of entertainment systems have either been incorporated into radios or function as stand-alone units. These include among others cassette players, compact disk ("CD") units, digital audio tapes ("DAT") and digital video disk ("DVD") units.

One problem with disk players, whether used in a stand-alone unit or within the disk portion of multimedia systems, is heat buildup. Heat buildup is a result of electronic components with higher power dissipation coupled with packaging constraints. Studies have shown that the heat emitted from the electronics and motor within a multimedia radio causes hot media and disk shutdown concerns. Similar concerns are found in stand-alone disk units.

Many techniques are currently used to try to dissipate the heat. For example, heat sinks are typically mounted to all radios and serve to remove heat. Heat sinks work well in single media radios, but do not dissipate enough heat from the disk components to be effective in multimedia systems or stand-alone disk units.

Also, electric fans added to the disk portion of the multimedia radio have been evaluated. The fans are used to try to dissipate the heat buildup from the surface of the disk. This technique is unworkable due to space constraints within the disk portion which limit the amount of available locations for mounting the fans. Other locations that are typically available to mount the electric fans do not provide ideal heat dissipation. Thus, to add an electric fan to dissipate the heat would require a large-scale design change, a costly and time consuming endeavor.

Further, thermoelectric devices and other heat management systems were evaluated in the disk portion of the multimedia radios. With these electrically driven devices, heat is pulled away from the heat source, in this case the disk portion. These devices were found to be ineffective for this application.

SUMMARY OF THE INVENTION

It is thus an object of the present invention to dissipate heat buildup in close proximity to the rotational disk component contained in a stand-alone disk unit or within the multimedia radio.

The above object is accomplished by applying the Von Karman Viscous "Pump" Principle to optimize airflow within the disk region to ventilate heated air away from the disk component and its related electronics. In application, this is accomplished by adding a series of venting holes to the housing that surrounds the disk portion at a position directly above or below the center of a disk. These venting holes induce ambient airflow to the center portion of the disk when the disk is spinning. As the disk rotates, the hot air is expelled outwardly away from the center of the disk. Another series of holes are added to the side of the housing to remove the heated air from the disk. In one preferred embodiment of the present invention, the surface of a CD placed into a multimedia radio having the hole design was approximately 10–15% (on a Centigrade Scale) cooler than the surface of a CD placed in a multimedia radio without the additional hole design.

It is contemplated that the present invention is ideally suited for combination radio/CD players used on automobiles and for combination radio/DVD players used on automobiles or for stand alone single or multiplayer CD and DVD players.

Other objects and advantages of the present invention will become apparent upon considering the following detailed description and appended claims, and upon reference to the accompanying drawings.

BRIEF DESCRIPTION OF THE DRAWINGS

FIG. 1A is a front view of a stand-alone disk player according to a preferred embodiment of the present invention;

FIG. 1B is a top view of the stand alone disk player of FIG. 1A according to a preferred embodiment of the present invention;

FIG. 1C is a left side view of the dual media radio of FIG. 1A according to a preferred embodiment of the present invention;

FIG. 1D is a right side of the dual media radio of FIG. 1A according to a preferred embodiment of the present invention;

FIG. 3 is section view of the dual media radio of FIG. 2A cut along line 3—3 according to a preferred embodiment of the present invention.

DESCRIPTION OF THE PREFERRED EMBODIMENT(S)

Figure 2B:
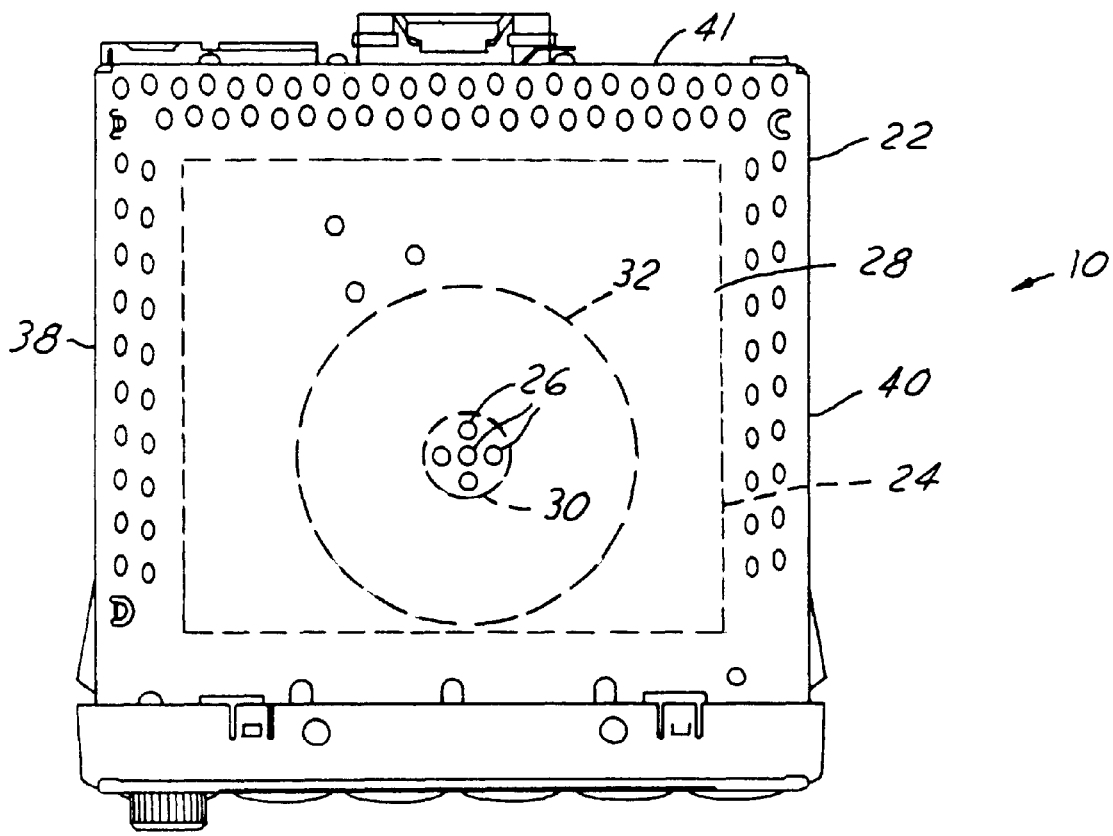
FIG. 2B is a top view of the dual media radio of FIG. 2A according to a preferred embodiment of the present invention.

FIGS. 1A through 1D illustrate multiple views of a stand-alone disk unit 5 according to one preferred embodiment of the present invention. The disk unit 5 may be a single or multiple CD player, a single or multiple DVD player, or any other unit utilizing a rotating disk that may be contemplated within the art.

The disk unit 5 comprises electronic circuitry (not shown) contained within a housing 6. As best seen in FIG. 1B, a series of holes 7 have been added to the top portion 8 of the housing 6. These holes 7 are aligned with the middle portion 30 of an installed disk 32 or DVD (not shown). These holes 7 provide an entry port for ambient air to aid in cooling the CD 32 using the Von Karman Viscous Pump Principle. This principle is described below in FIGS. 4A and 4B. While the preferred embodiment of the present invention as shown in FIG. 1A shows five holes 7 in a substantially cross-shape, it is contemplated that the number, size, and configuration of the holes 7 may be modified and still achieve the same result. In addition, while this embodiment shows the holes 7 only on the top portion 8 of the housing 6, the holes 7 could be placed on the bottom portion 9, or on both on the top portion 7 and bottom portion 9, depending upon the cooling requirements of the system.

Referring now to FIGS. 1C and 1D, a series of vents 11*l*, 11*r* have been added to the left side portion 12*l* and the right side portion 12*r* of the disk housing 6, respectively. These vents 11*l*, 11*r* are provided to remove heated air from the housing 6 when the CD 32 is playing. While the preferred embodiment of the present invention shows seven vents 11*l* on the left side portion 12*l* and thirteen vents 12*r* on the right side portion 12*r*, it is contemplated that the number, size and configuration of vents 11*l*, 11*r* may be modified and still achieve the same result. Further, it is contemplated that either the vents 11*l* or vents 11*r* may be eliminated depending upon the desired heat dissipation requirements of the system.

FIGS. 2A, 2B, 2C, 2D and 3 illustrate another preferred embodiment in which the disk player is incorporated within a multimedia radio.

Figure 2A:
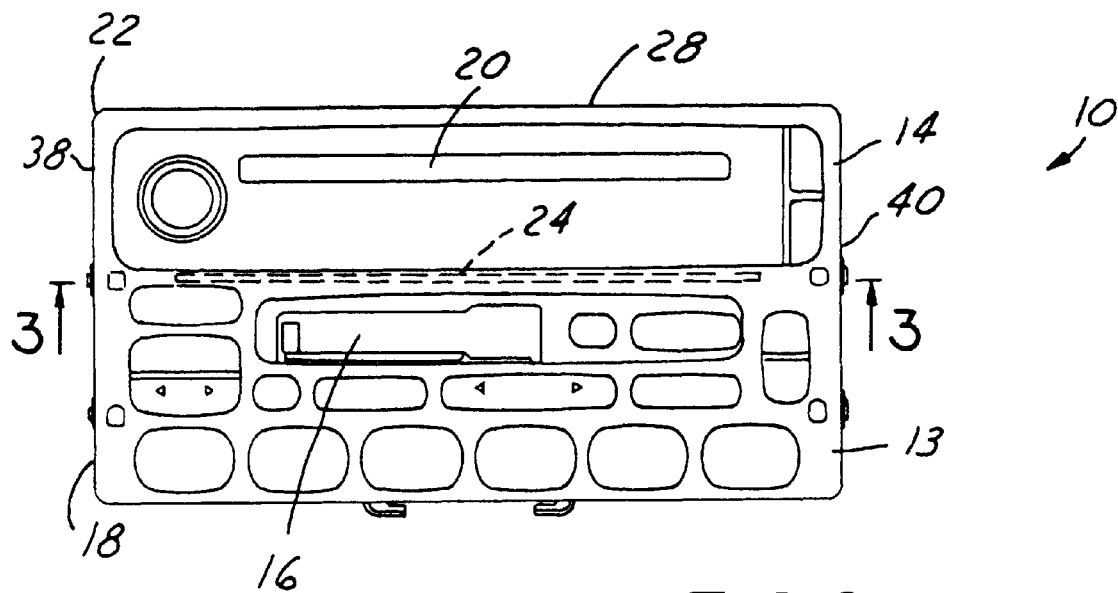
FIG. 2A is a front view of a multimedia system having a disk player according to a preferred embodiment of the present invention.

Referring now to FIG. 2A, a multimedia radio 100 having a radio portion 13 and a disk portion 14 is shown according to another preferred embodiment of the present invention. The radio portion 13 typically comprises an AM/FM radio (not shown), and may also include a cassette player 16, contained within a multimedia housing 18. The disk portion 14 is comprised of either a single or multiple CD player 20 or a single or multiple DVD player (not shown), contained within a disk housing 22. However, other disk type devices may comprise the disk portion 14. A bracket 24 typically separates the radio portion 13 and disk portion 14.

Referring to FIG. 2B, a series of holes 26 have been added to the top portion 28 of the disk housing 22. These holes 26 are aligned with the middle portion 30 of an installed CD 32 or DVD (not shown). These holes 26 provide an entry port for ambient air to aid in cooling the disk portion 18 and specifically to cool the CD 32 using the Von Karman Viscous Pump Principle. This principle is described below in FIGS. 4A and 4B. While the preferred embodiment of the present invention as shown in FIG. 2 shows five holes 26 in a substantially cross-shape, it is contemplated that the number, size, and configuration of the holes 26 may be modified and still achieve the same result.

Figure 2C:
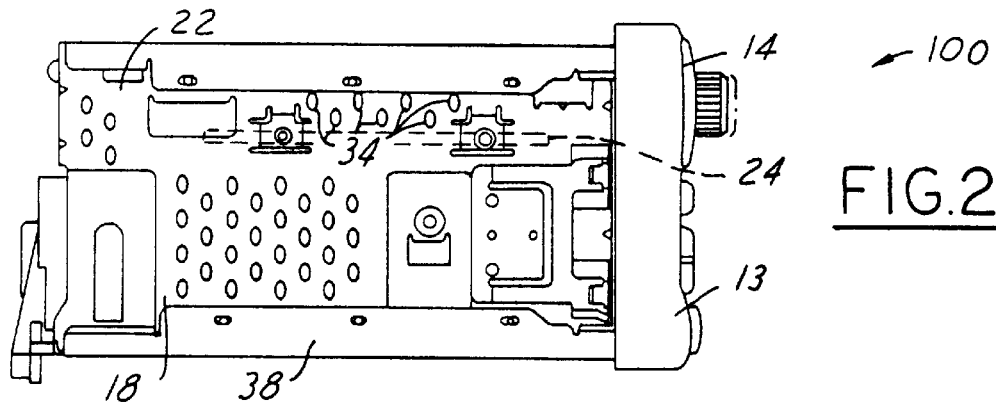
FIG. 2C is a left side view of the dual media radio of FIG. 2A according to a preferred embodiment of the present invention.
Figure 2D:
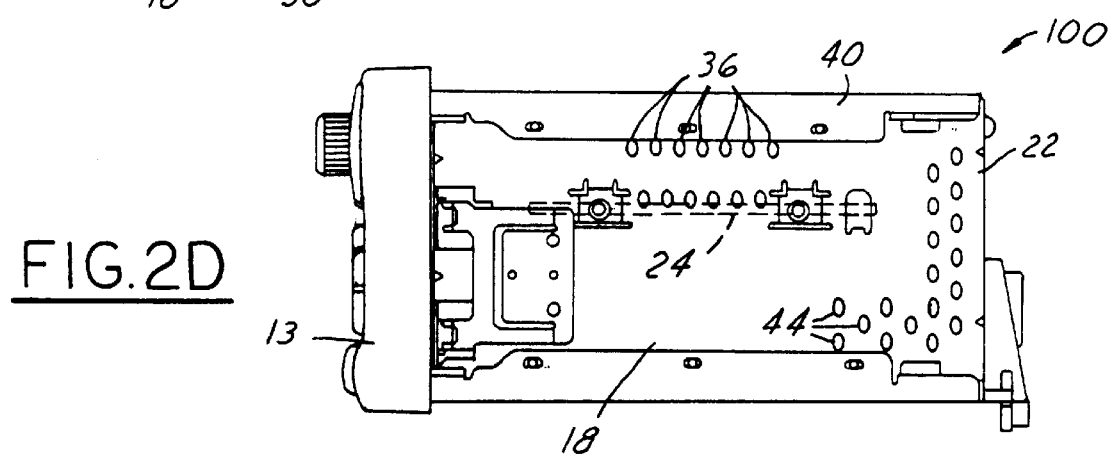
FIG. 2D is a right side of the dual media radio of FIG. 2A according to a preferred embodiment of the present invention.

Referring now to FIGS. 2C and 2D, a series of vents 34, 36 have been added to the left side portion 38 and the right side portion 40 of the disk housing 22, respectively. These vents 34, 36 are provided to remove heated air from the disk portion 14 when the CD 32 is playing. While the preferred embodiment of the present invention shows seven vents 34 on the left side portion 38 and thirteen vents 36 on the right side portion 40, it is contemplated that the number, size and configuration of vents 34, 36 may be modified and still achieve the same result. Further, it is contemplated that either the vents 34 or vents 36 may be eliminated depending upon the desired heat dissipation requirements of the system.

Further, as seen of FIG. 2D, a second series of vents 44 have been added to the radio housing 18. These vents 44 provide a source of incoming ambient air to the radio portion 13 to replace the air that flows through the bracket 24 to the disk portion 14. Again, while the preferred embodiment of the present invention shows five vents 44 in a distinctive pattern, it is specifically contemplated that the number, size, and configuration of the vents 44 may be modified depending upon the amount of ambient air that is required.

FIG. 3 is a cross-section view of FIG. 2A showing a bottom view 48 of the bracket 24. A series of holes 46 are drilled through the bracket 24 and the disk housing 22. These holes are approximately directly below the center portion 30 of the CD 32 contained within the disk portion 18. The function of these holes 46 is the same as the holes 26 in the top portion 28, that is to provide air flow according the Von Karman Viscous Pump Principle from the radio portion 13 to the disk portion 14, and specifically to the bottom of the CD 32, when the CD 32 is in operation. Again, as above, the number, size and configuration of these holes 46 may be modified according to the cooling requirements of the system.

While the embodiments depicted in FIGS. 2A–D and 3 show the disk portion 14 above the radio portion 13, it is specifically contemplated that the disk portion 14 could be below the radio portion 13 in a multimedia system 100 or in any other possible scenario and still apply the cooling principles described above and below. Further, a bracket 24 could be added to separate the radio portion 13 from the disk portion 14.

Figure 4A:
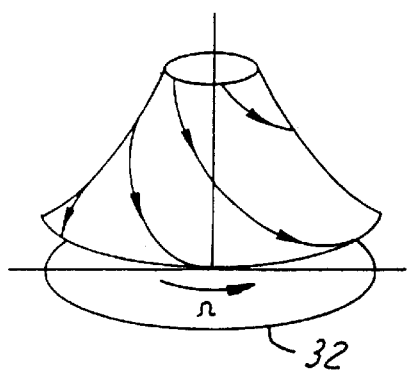
FIGS. 4A and 4B show flow of air exhibiting the Von Karman Viscous "Pump" effect as applied to a disk according to a preferred embodiment of the present invention.
Figure 4B:
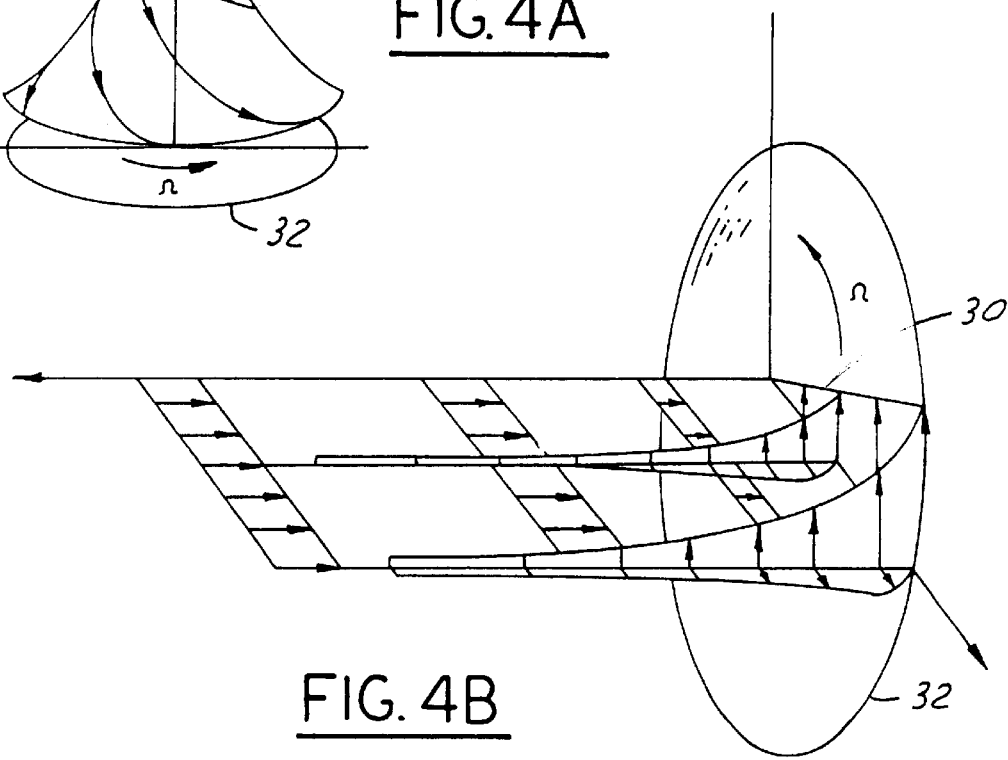

Referring now to FIGS. 4A and 4B, the Von Karman Viscous "Pump" Principle as applied to a stand-alone unit 5 or in the multimedia radio 100 is shown in two views. A flat disk, such as a CD 32 or DVD, is rotated at a speed $\Omega$ in a semiinfinite airflow. Airflow is designated in FIGS. 6A and 6B by arrows. Attention is focused on the flow on one side of the CD 32 in the local region in FIGS. 6A and 6B, or middle region 30, near the axis of rotation. However, in other preferred embodiments of the present invention, flow is on both sides of the CD 32.

At the surface 42 of the CD 32, the no-slip condition requires that the air rotate with the same velocity as the CD 32. Viscous effects diffuse away from the CD 32 and induces a rotation in nearby air in the same manner as Rayleigh's impulsive plate. However, there is no pressure gradient in the radial direction to balance the centrifugal force. Once air particles have been accelerated by the CD 32, they are flung out in a radial flow. Continuity demands that there is a replacement of the outward flow. This is accomplished by axial flow toward the CD 32 from the quiescent air far from the CD 32. Air particles are pumped from the far stream towards the CD 32, where viscous flow induce a swirl; then the resulting centrifugal effect produces radial flow.

According to the Von Karman Viscous Pump Principle, the flow rate of air particles is affected by the rotational speed $\Omega$ of the disk and the size of the disk used. As the size of the disk or speed of the disk increases, the flow rate correspondingly increases.

In operation, a CD 32 is placed into the housing 6 of the stand-alone unit 5 or within the disk housing 22 of the multimedia radio 100. The CD 32 then rotates within the housing. Ambient air is then induced to flow through the holes 7, 26 towards the middle portion 30 of the CD 32. These air particles are then accelerated along the surface 42 of the CD 32 and expelled radially. As the air approaches the surface 42 of the CD 32, the air particles are heated. Vents 11*l*, 11*r* on the sides of the housing 6 or vents 34, 36 on the side of the disk housing 22, respectively, take the heated air particles away from the CD 32. If necessary, the Von Karman Viscous Pump Principle could be applied to cool both sides of the CD 32 or DVD simultaneously by adding a second set of holes directly opposite the first set of holes 7, 26.

Studies indicate that introducing holes 7, 46 in a multimedia radios 100 having a CD 32 within the disk portion 14 decreases the temperature of a CD 32 by approximately 13.6% (from 87.4 to 75.5 degrees Celsius) versus a system without the improvements at 200 rpm. Further, a 9.7% reduction was measured (from 72.9 to 65.8 degrees Celsius) at 600 rpm. Similar results are expected for embodiments having utilizing a DVD or other disk in place of the CD 32.

While the invention has been described in terms of preferred embodiments, it will be understood, of course, that the invention is not limited thereto since modifications may be made by those skilled in the art, particularly in light of the foregoing teachings.

What is claimed is:

1. An improved disk system having either a single or multiplayer disk player contained within a housing, the improvement comprising;
   at least one hole placed in a first surface of the housing, wherein said at least one hole is positioned approximately directly adjacent to a center portion of a first side of a disk placed within said housing, said at least one hole capable of providing air flow to said first side of said disk when said disk is rotating;
   at least one vent hole placed in a side portion of the housing, said at least one vent hole capable of venting air from the housing when said disk is rotating; and
   a multimedia radio coupled to the disk system and contained within said housing, wherein said multimedia radio is closely coupled with a second surface of the housing, said second surface located on the opposite side of the housing from said first surface.

2. The disk system of claim 1 further comprising a bracket disposed between said disk system and said multimedia radio, said bracket defining a disk portion containing the single or multiplayer disk player and a multimedia radio portion containing said multimedia radio.

3. The disk system of claim 2 further comprising at least one second hole placed in said bracket, wherein said at least one second hole is located approximately adjacent to said center portion of a second side of said disk and is capable of providing air flow to said second side of said disk within said disk portion when said disk is rotating; and,
   at least one second vent hole placed in a second side portion of the housing, said at least one second vent hole capable of venting air to said multimedia radio portion when sad disk is rotating.

4. The disk system of claim 1 further comprising at least one second vent hole placed on a second side portion, said at least one second vent hole being located on the opposite side of the housing from said at least one vent hole, said at least one second vent hole capable of venting air from the housing when said disk is rotating.

5. The disk system of claim 1 further comprising at least one second hole placed in a second surface of the housing, wherein said at least one second hole is located approximately directly adjacent to a center portion of a second side of a disk placed within the housing said at least one second hole capable of providing air flow to second side of said disk when said disk is rotating.

6. The disk system of claim 1, wherein the configuration of said at least one hole is a function of the rotational speed and size of said disk.

7. The disk system of claim 1, wherein size of said at least one hole is a function of the rotational speed and size of said disk.

8. The disk system of claim 1, wherein the single or multiplayer disk system is selected from the group consisting of a single compact disk player, a single digital video disk player, a multiple compact disk player, and a multiple digital video disk player.

9. An improved disk system having either a single or multiplayer disk player contained within a housing, the improvement comprising:
   at least one hole placed in a first surface of the housing, wherein said at least one hole is positioned approximately directly adjacent to a center portion of a first side of a disk placed within said housing, said at least one hole capable of providing air flow to said first side of said disk when said disk is rotating;
   at least one vent hole placed in a side portion of the housing, said at least one vent hole capable of venting air from the housing when said disk is rotating; and
   a multimedia radio coupled to the disk system, said multimedia radio having a radio housing distinct from the housing, wherein said multimedia radio is closely coupled with a second surface of the housing.

10. The disk system of claim 9 further comprising at least one second hole placed in a second surface of the housing and a first multimedia surface of said multimedia radio, wherein said second surface is closely coupled with said first multimedia surface, wherein said at least one second hole is located approximately adjacent to said center portion of a second side of said disk and is capable of providing air flow to said second side of said disk when said disk is rotating; and,
   at least one second vent hole placed in a first side portion of said multimedia housing, said at least one second vent hole capable of venting air to said multimedia housing when said disk is rotating.

11. The disk system of claim 9, wherein the configuration of said at least one hole is a function of the rotational speed and size of said disk.

12. The disk system of claim 9, wherein the size of said at least one hole is a function of the rotational speed and size of said disk.

13. The disk system of claim 9, wherein the single or multiplayer disk system is selected from the group consisting of a single compact disk player, a single digital video disk player, a multiple compact disk player, and a multiple digital video disk player.

14. A method of dissipating heat buildup on an installed disk within the disk portion of a multimedia radio, the method comprising;
   introducing at least one hole to a first surface of a disk housing, wherein said at least one hole is located approximately adjacent to a center portion of a first surface of the installed disk and is capable of drawing ambient air to said first surface of the installed disk through said at least one hole when the installed disk is operational; and,
   introducing at least one venting hole to a first side portion of the disk housing, wherein said at least one venting hole is capable of expelling heated air from said first surface through said at least one venting hole;
   introducing at least one access hole to a bracket separating the disk portion from a radio portion of the multimedia radio, wherein said at least one access hole extends through said disk housing, wherein said at least one access hole is located approximately adjacent to said center portion of a second surface of said installed disk and is capable of drawing air from said radio portion through said at least one access hole to said second surface of the installed disk when the installed disk is operational; and
   introducing at least one radio venting hole to a radio side portion of said radio housing of said radio portion, wherein said at least one radio venting hole is capable of drawing ambient air through said at least one radio venting hole and into said radio portion when the installed disk is operational.

15. A method of dissipating heat buildup on an installed disk within the disk portion of a multimedia radio, the method comprising:

introducing at least one hole to a first surface of a disk housing, wherein said at least one hole is located approximately adjacent to a center portion of a first surface of the installed disk and is capable of drawing ambient air to said first surface of the installed disk through said at least one hole when the installed disk is operational; and, introducing at least one venting hole to a first side portion of the disk housing, wherein said at least one venting hole is capable of expelling heated air from said first surface through said at least one venting hole;

introducing at least one access hole to a radio housing separating the disk portion from a radio portion of the multimedia radio, wherein said at least one access hole extends though a second surface of the disk housing, wherein said at least one access hole is located approximately adjacent to said center portion of a second surface of said installed disk and is capable of drawing air from said radio portion through said at least one access hole to said second surface of the installed disk when the installed disk is operational; and introducing at least one radio venting hole to a radio side portion of said radio housing of said radio portion, wherein said at least one radio venting hole is capable of drawing ambient air through said at least one radio venting hole and into said radio portion when the installed disk is operational.

* * * * *